(12) United States Patent
    Engl

(10) Patent No.: US 9,273,934 B2
(45) Date of Patent: Mar. 1, 2016

(54) BULLET-PROOF GLASS PANE AND ASSOCIATED BULLET-RESISTANT APPARATUS

(75) Inventor: Andreas Engl, München (DE)

(73) Assignee: ISOCLIMA S.P.A., Este (IT)

( * ) Notice: Subject to any disclaimer, the term of this patent is extended or adjusted under 35 U.S.C. 154(b) by 297 days.

(21) Appl. No.: 13/979,440

(22) PCT Filed: Jan. 4, 2012

(86) PCT No.: PCT/DE2012/000004
§ 371 (c)(1),
(2), (4) Date: Aug. 21, 2014

(87) PCT Pub. No.: WO2012/095098
PCT Pub. Date: Jul. 19, 2012

(65) Prior Publication Data
US 2015/0000511 A1    Jan. 1, 2015

(30) Foreign Application Priority Data
Jan. 12, 2011  (DE) .............. 20 2011 001 371 U

(51) Int. Cl.
*F41H 5/04*    (2006.01)
*F41H 5/26*    (2006.01)
*B32B 17/10*   (2006.01)

(52) U.S. Cl.
CPC .......... *F41H 5/263* (2013.01); *B32B 17/10045* (2013.01); *B32B 17/1077* (2013.01); *B32B 17/10293* (2013.01); *B32B 17/10761* (2013.01); *F41H 5/0407* (2013.01); *F41H 5/0478* (2013.01); *B32B 2369/00* (2013.01); *B32B 2571/02* (2013.01); *Y10T 428/239* (2015.01)

(58) Field of Classification Search
CPC ................ B32B 17/1077; B32B 17/10293; B32B 17/10761; B32B 17/10045; F41H 5/263; F41H 5/0478; F41H 5/0407
USPC .......... 296/146.15, 187.07, 190.01, 200, 201, 296/96.21
See application file for complete search history.

(56) References Cited

U.S. PATENT DOCUMENTS

| 2,345,336 | A | * | 3/1944 | Fox .............................. 109/58.5 |
| 6,129,974 | A | * | 10/2000 | Woll .............................. 428/192 |
| 6,276,100 | B1 | * | 8/2001 | Woll et al. .................. 52/204.62 |

(Continued)

FOREIGN PATENT DOCUMENTS

| DE | 4006711 A1 | * | 9/1991 | .................. B60J 1/17 |
| DE | 4142416 A1 |   | 6/1993 | |

(Continued)

OTHER PUBLICATIONS

International Search Report dated May 14, 2012.

*Primary Examiner* — Jason S Morrow
*Assistant Examiner* — E Turner Hicks
(74) *Attorney, Agent, or Firm* — Hauptman Ham, LLP

(57) ABSTRACT

The present invention relates to a bullet-proof glass pane, in particular for use in a motor vehicle, comprising a ballistic block comprising a plurality of panes of glass, ceramic or plastic material bonded to each other over their surfaces in a layered composite, and interposed bonding interlayers of plastic material, wherein at least one bullet-resistant strip is provided, having, in particular, an essentially rectangular cross-section and covering the ballistic block of the bullet-proof glass pane at its peripheral edge.

16 Claims, 2 Drawing Sheets

(56) References Cited

U.S. PATENT DOCUMENTS

Figure 1:
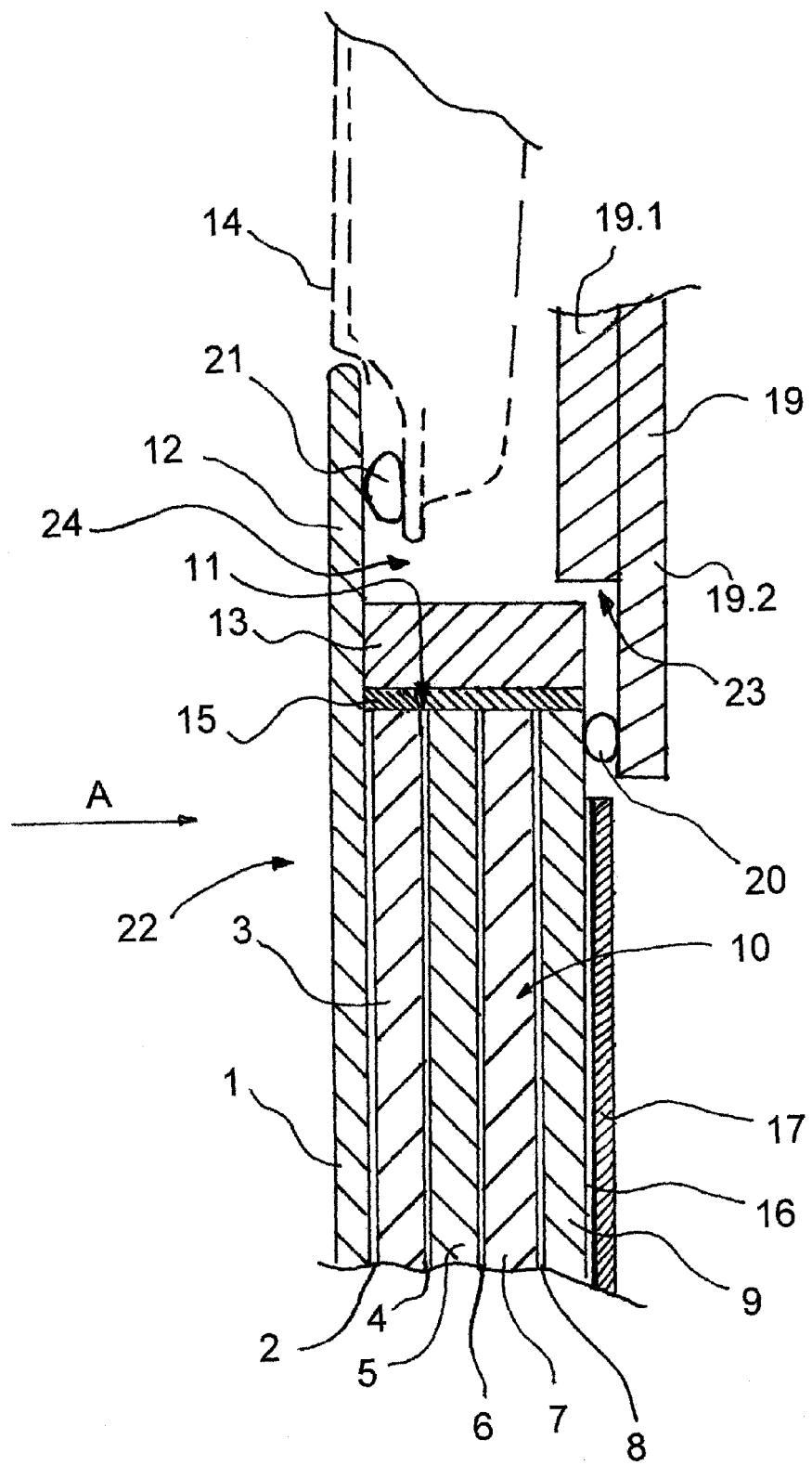

| | | |
|---|---|---|
| 6,280,826 B1 | 8/2001 | Woell et al. |
| 6,565,980 B1 * | 5/2003 | Ackermann ............... 428/425.6 |
| 2005/0172792 A1 | 8/2005 | Wolf et al. |
| 2008/0187721 A1 * | 8/2008 | Engl ............................ 428/172 |
| 2010/0300276 A1 * | 12/2010 | Justamon ..................... 89/36.02 |
| 2013/0171398 A1 * | 7/2013 | Stranner ........................ 428/38 |

FOREIGN PATENT DOCUMENTS

| | | |
|---|---|---|
| DE | 4335336 A1 | 4/1995 |
| DE | 4415879 A1 | 11/1995 |
| DE | 19745248 A1 | 4/1999 |
| DE | 19918526 A1 | 10/2000 |
| DE | 10043793 A1 | 3/2002 |
| DE | 10048566 A1 | 4/2002 |
| DE | 10244368 A1 | 4/2004 |
| DE | 102010020560 A1 | 11/2011 |
| EP | 0528354 A1 | 2/1993 |
| EP | 1004433 A1 | 5/2000 |
| EP | 1010963 A2 | 6/2000 |
| EP | 2434249 A1 | 3/2012 |
| WO | 03078917 A1 | 9/2003 |

* cited by examiner

BULLET-PROOF GLASS PANE AND ASSOCIATED BULLET-RESISTANT APPARATUS

RELATED APPLICATIONS

The present application is a National Phase of International Application Number PCT/DE2012/000004, filed Jan. 4, 2012, and claims priority from German Application Number 202011001371.5, filed Jan. 12, 2011.

The present invention relates to a bullet-proof glass pane and an associated bullet-resistant apparatus according to the preambles of claim 1 and claim 11, respectively, in particular for use in a motor vehicle.

Such a bullet-proof glass pane is described, for example, in EP 1 004 433 B1. This bullet-proof glass pane is used as the windscreen of a car and has the structure of a composite glass pane with a plurality of glass panes and interposed bonding interlayers of plastic material, e.g. polyurethane. At the outer periphery or circumference of the prior-art bullet-proof glass pane, there is a protrusion, which is part of an outside pane of bullet-proof glass and engages or is mounted on a frame or a lip of a body of the automotive vehicle. Adjacent to this outside pane, is a ballistic block of one glass pane or a plurality of glass panes with a corresponding number of interposed bonding interlayers. The ballistic block has a stepped configuration extending from the outer pane of the bullet-proof glass pane toward the inside of the automotive vehicle, the protrusion thus protrudes over the ballistic block. Upon impact from the outside, it can happen that a ballistic bullet impacts on the bullet-proof glass pane in the edge area in such an unfavorably oblique angle that it pierces the bullet-proof glass pane and can thus pass into the interior of the vehicle with potentially harmful consequences for the passengers of the vehicle.

It is thus an object of the present invention to provide a bullet-proof glass pane which has the required bullet-resistant properties also in the peripheral edge area.

This object is achieved by the bullet-proof glass pane according to claim 1. Accordingly the bullet-proof glass pane according to the present invention which is preferably used in a motor vehicle, e.g. as the windscreen in an automotive vehicle, has a bullet-resistant ballistic block comprising a plurality of panes of glass, ceramic or plastic material, bonded to each other over their surfaces in a layered composite, and at least one strip, which can have, in particular, an essentially rectangular cross-section and which covers the ballistic block of the bullet-proof glass pane at its peripheral edge or at its end face in a flush manner.

The bullet-proof glass pane of the present invention has the considerable advantage that due to the bullet-resistant strip at the circumferential end face of the ballistic block, it is even able to withstand bullets impacting in an unfavorably oblique angle on the outside of the bullet-proof glass pane in its outer peripheral area or circumferential area, and thus provides the required bullet-resistant properties. Moreover, the bullet-resistant strip of the bullet-proof glass pane of the present invention also prevents splintering of glass in the edge area of the bullet-proof glass pane as a consequence of impacting bullets, or substantially reduces such splintering. As a consequence, in the case of impacting bullets, splintering of glass toward the inside of the vehicle, for example into the passenger compartment or the driver cabin, is prevented. The security of the vehicle's passengers is thus improved overall by the present invention.

The bullet-proof glass pane of the present invention can be formed as a composite security glass pane, e.g. as a windshield, fixed to the vehicle, or as a moveable, retractable or extendable side window of a vehicle.

The bullet-resistant strip can have any essentially rectangular cross-section or any other shape, e.g. a semicircular cross-section, as long as the ballistic block of the bullet-proof glass pane is covered at its end face in a flush manner in such a way that the resistance of the bullet-proof glass pane against piercing by a bullet is increased.

The bullet-resistant strip or the bullet-resistant bar can be of any bullet-resistant material, for example of a plastic material, such as polycarbonate, of a ceramic material, such as aluminum oxynitrite (AION), a woven material, such as a carbon-fiber mat, or preferably of a metal, in particular steel.

The bullet-resistant strip can be a full or partial frame, such as a framing strip on three sides or an edge reinforcement of steel, which will only be provided on part of the circumference of the bullet-proof glass pane. The strip or the steel bar can be assembled of individual parts, arranged in series on the circumference of the bullet-proof glass pane, or on an end face of the ballistic block, in order to form the complete strip.

The ballistic block of the bullet-proof glass pane of the present invention is adjacent to an additional outer pane of the bullet-proof glass pane, when a protrusion is formed by this outer glass pane at the edge of the bullet-proof glass pane. If, however, there is no outer glass pane with a protrusion, then the bullet-proof glass pane only consists of the ballistic block which the bullet-resistant strip completely covers at its circumference or at its end faces.

The ballistic block can have a stepped configuration at its end face from the outside to the inside, thereby providing a space-saving and compact structure of the bullet-proof glass pane according to the present invention and also a space-saving structure when the bullet-proof glass pane is installed or mounted in or on the vehicle.

The outer pane of the bullet-proof glass pane can be at least one outer glass pane, ceramic pane or plastic pane, which is bonded to the ballistic block on the side of impact and protrudes over the ballistic block itself at the outer periphery or circumference of the bullet-proof glass pane. As a consequence, the edge of the bullet-proof glass pane according to the present invention can be formed in such a manner that the protrusion, together with this strip on the ballistic block, are flush as seen from the edge.

The outer pane of the bullet-proof glass pane, however, can also be formed by at least one glass pane, ceramic pane or plastic pane, which is bonded to the ballistic block on the side of impact, or which forms a composite with the latter, and which protrudes over the ballistic block and the strip mounted thereon on the outer periphery of the bullet-proof glass pane, in order to form a protrusion of the bullet-proof glass pane. The bullet-proof glass pane of the present invention can then be mounted with its protrusion on or in a frame or rabbet of the body of a motor vehicle or be held therein.

The protrusion of the bullet-proof glass pane of the present invention can have, for example, a stepped configuration toward the interior of the vehicle, can thus have one step or a plurality of steps to enable the pane to be mounted on the vehicle in a space-saving manner.

The ballistic block can have a stepped configuration toward the interior of the vehicle with one or more steps at the outer periphery of the bullet-proof glass pane, resulting in at least two or more faces or end surfaces at the end face of the ballistic block extending in parallel and offset with respect to each other. As a consequence, corresponding to the end surfaces, two or more separate bullet-resistant strips having essentially a rectangular cross-section, will be provided, which will cover the individual end surfaces and thus the entire end face of the ballistic block in a flush manner. By providing the stepped configuration of the ballistic block, a further reduction of the space needed by the bullet-proof glass pane according to the present invention can be achieved, which has particular advantages when a vehicle is to be provided with heavy armor and corresponding extremely thick bullet-proof glass panes of heavy weight.

In the case of a ballistic block having a stepped configuration, the bullet-resistant strips can have the same or different thicknesses as viewed in a direction normal to the bullet-proof glass pane and/or as viewed in a direction toward the outer periphery of the bullet-proof glass pane, this ensures the improvement of the bullet-resistant properties of the bullet-proof glass pane or the reduction of the splinter intrusion risk as a bullet impacts on the edge, depending on the conditions for installation in or on a body.

The bullet-resistant strip or strips are preferably bonded to the ballistic block, e.g. by means of a polyurethane layer, in order to ensure a composite structure with the ballistic block of long durability.

The present invention also relates to an associated bullet-resistant apparatus or security apparatus, in particular in an automotive or motor vehicle according to claim 11. Accordingly, this apparatus or this security structure of the present invention comprises a bullet-proof glass pane according to any one of claims 1 to 10, and a bullet-resistant armoring device or means arranged in the interior of the motor vehicle in the vicinity of the bullet-proof glass pane and overlapping the bullet-proof glass pane in an area of the outer periphery of the bullet-proof glass pane, ensuring and improving, among other things, the required bullet-resistant properties in an outer peripheral area or circumferential area in the installed state of the bullet-proof glass pane in the vehicle body even when impacted in an unfavorably oblique angle in this edge area.

Preferably, the armoring device can support the bullet-proof glass pane, which is advantageous, in particular, for a very heavy bullet-proof glass pane and which enables additional mounting capability in addition to the attachment or mounting of the bullet-proof glass pane on a frame or rabbet of the vehicle body.

The ballistic block of the bullet-proof glass pane can have a stepped configuration at its end face, and the armoring device can also have a stepped configuration corresponding to the stepped configuration of the ballistic block, so that it engages the stepped configuration of the ballistic block of the bullet-proof glass pane. By these means, a compact and space-saving structure of the security apparatus of the invention can be achieved.

The bullet-proof glass pane can generally be mounted in or on, or be in engagement with, a frame or rabbet of a vehicle body, wherein the frame or rabbet supports the bullet-proof glass pane. In particular, the bullet-proof glass pane can have a protrusion at its outer periphery, which is attached or bonded in or on a stepped profile of a vehicle body.

The protrusion of the bullet-proof glass pane can have a stepped configuration at the end face toward the interior of the vehicle, with one step or a plurality of steps, and the stepped profile of the vehicle body can also have a stepped configuration toward the exterior of the vehicle, having one or a plurality of steps, which correspond to the stepped configuration of the protrusion of the bullet-proof glass pane in such a manner that it engages the stepped configuration of the protrusion or is adapted thereto so that security against impact can be further improved at the edge, and moreover a compact and space-saving structure of the security apparatus can be achieved. A height and/or width of the steps of the protrusion of the bullet-proof glass pane and the steps of the profiled frame of the body can have the same or different shapes with respect to each other.

Further advantageous elaborations of the present invention can be seen from the dependent claims.

Figure 2:
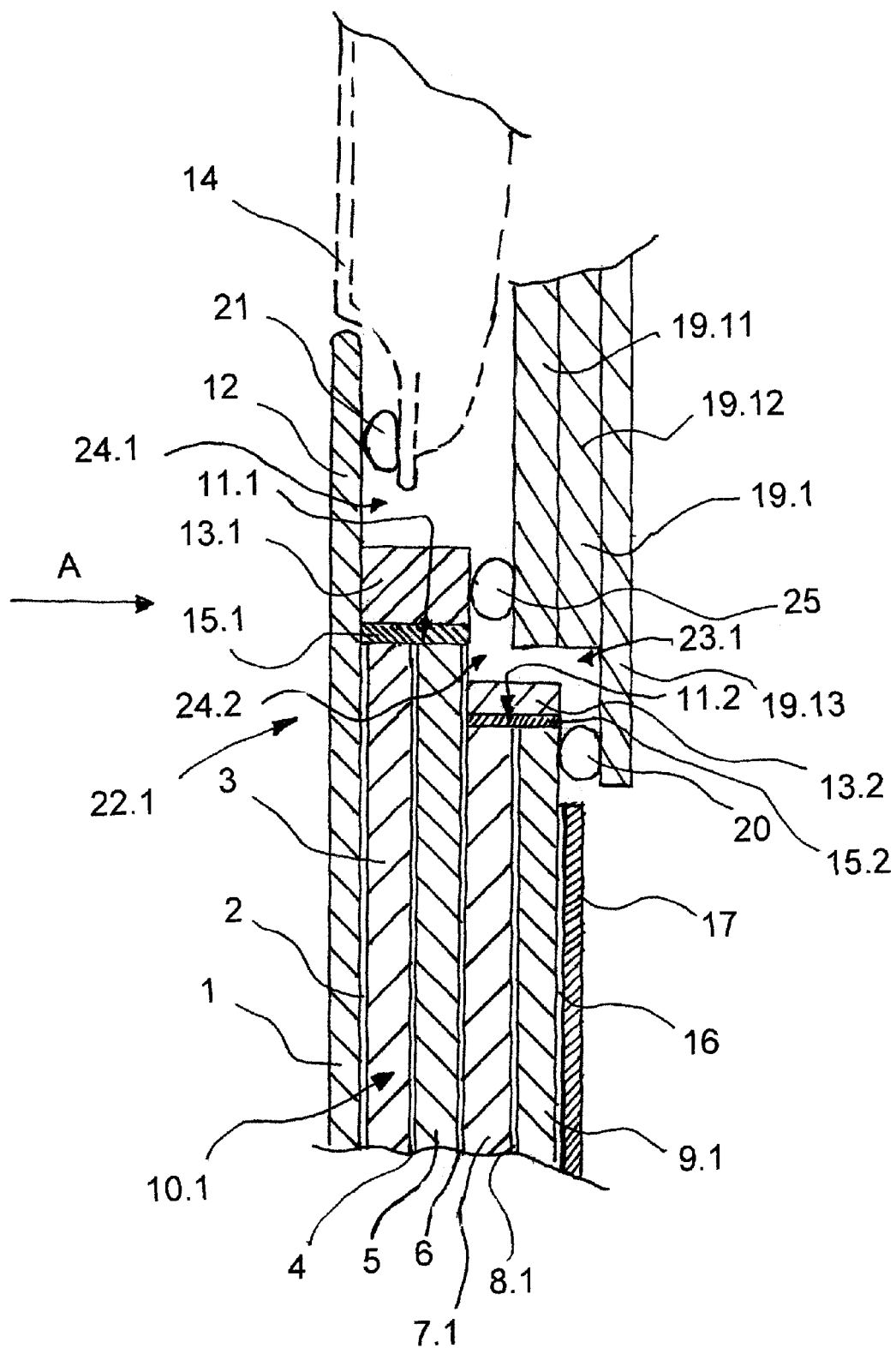

Further advantages, advantageous elaborations and usages of the invention can be seen from the following description of exemplary and preferred embodiments of the invention with reference to the accompanying drawings, wherein:

FIG. 1 is a schematic and partial cross-sectional view of a bullet-proof glass pane according to a preferred embodiment of the invention with an associated apparatus of the invention; and FIG. 2 is a schematic and partial cross-sectional view of a further bullet-proof glass pane according to a preferred embodiment of the invention with an associated apparatus of the invention.

FIG. 1 shows a partial view of a preferred embodiment of the bullet-proof glass pane 22 of the present invention as a composite security pane in cross-section together with a body frame 14, indicated with a broken line. The following is a detailed explanation of the embodiment of the invention shown in FIG. 1 with exemplary reference to the usage of the bullet-proof glass pane according to the present invention as the windscreen of a motor vehicle.

The transparent bullet-proof glass pane 22 of FIG. 1 has five sandwiched or laminated glass panes 1, 3, 5, 7 and 9, wherein the innermost glass pane 9 is arranged on the inside of the vehicle, the outermost glass pane 1 is arranged on the outside of the vehicle, i.e. on the side of impact, and the glass panes 3, 5 and 7 are arranged between the outermost glass pane 1 or outer glass pane and the innermost glass pane 9. The outside and thus the impact side of the vehicle, is indicated by arrow A in FIG. 1, which faces toward the outer glass pane 1. Between the outer glass pane 1 and the subsequent glass pane 3, a bonding interlayer 2 of plastic material, e.g. of polyurethane (PU) or polyvinyl butyral (PVB), extends which creates a composite or laminate between the outer glass pane 1 and the glass pane 3. The bonding interlayer or composite foil, e.g. a polyurethane foil, has the same contour and surface extension as the glass pane 3.

Between the glass pane 3 and the glass pane 5 further to the inside, a further bonding interlayer 4, e.g. a further polyurethane layer, or a bonding interlayer of polyvinyl butyral (PVB) is formed, again providing a strong bond between the glass pane 3 and the subsequent glass pane 5. The bonding interlayer 4 has the same surface extension as the adjacent side surfaces of the glass panes 3 and 5.

Between the glass pane 5 and the glass pane 7 further to the inside, a further bonding interlayer 4, e.g. a further polyurethane layer, or a bonding interlayer of polyvinyl butyral (PVB) is formed, again creating a strong bond between the glass panes 5 and 7. Again, the bonding interlayer 6 has the same surface extension as the adjacent side surfaces of glass panes 5 and 7.

Between glass pane 7 and the subsequent inner glass pane 9, a bonding interlayer 8, e.g. a further polyurethane layer, or a bonding interlayer of polyvinyl butyral (PVB) is formed, again creating a strong bond between the glass panes 7 and 9. Again, bonding interlayer 8 has the same surface extension as the adjacent side surfaces of glass panes 7 and 9. Glass panes 3, 5, 7 and 9 together with bonding interlayers 2, 4, 6 and 8, form a ballistic block 10, which has a peripheral, planar and flush end face 11.

The outer glass pane 1 protrudes over the other glass panes 3, 5, 7 and 9, and the ballistic block 10 at the edge or circumference of the bullet-proof glass pane according to the present invention of FIG. 1, as a protrusion 12, thus forming a stepped configuration 24 or step with respect to the other glass panes 3 to 9, or the ballistic block 10, at the end face, or periphery of the bullet-proof glass pane.

At the end face 11 of the ballistic block 10, a bullet-resistant strip 13 with a rectangular cross-section is mounted, which is attached by means of a bonding interlayer 15, e.g. a polyurethane layer or adhesive layer, on the planar end face 11 in a strong bond and covering the ballistic block 10 at the planar end face in a flush manner. The bullet-resistant strip 13 is of steel, in particular a ballistic steel, enclosing the bullet-proof glass pane in a frame-like manner. The bullet-resistant strip 13 can be assembled of a plurality of series-mounted strip portions loosely engaging each other at the abutment positions to achieve a certain mutual mobility to be able to compensate dimensional variations of the strip 13 due to temperature variations, so that damage to the bullet-proof glass pane is avoided. The steel strip 13 can be treated by means of cathodic immersion and baking finish to protect it against corrosion.

In an exemplary bullet-proof glass pane 22 of the present invention according to FIG. 1, the thicknesses of the glass panes 1, 3, 5, 7 and 9 are between about 2 mm and 6 mm, the thicknesses of the bonding interlayers between about 0.5 mm and 1.5 mm, the thickness of the rectangular strip 13 of steel is in a range between about 2 mm and 8 mm, and the thickness of the bonding interlayer 15 is in a range between 0.5 mm and 2 mm.

A succession of layers with a polyurethane layer 16 and the polycarbonate pane 17 is provided on the inner surface of the inner glass pane 9, which is shorter than the inner glass pane 9, i.e. the inner glass pane protrudes over the layers 16 and 17. The thickness of this additional polyurethane layer 16 is about 1.9 mm, and the thickness of the polycarbonate pane 17 is about 2.5 mm.

FIG. 1 is a schematic partial view of a first embodiment of the bullet-resistant apparatus or security apparatus according to the present invention, which comprises the bullet-proof glass pane 22 and the armoring device 19, which is mounted on the inside of the vehicle body and overlaps the outer area of the bullet-proof glass pane 22 in order to ensure the required bullet-resistant properties.

The armoring device 19 is of two bonded plates 19.1 and 19.2 or reinforcements, in particular of ballistic steel, wherein the plate 19.1 extends into the close vicinity of the strip 13 of the bullet-proof glass pane 22 and overlaps the protrusion 12, and the plate 19.2, arranged further toward the interior, extends into the close vicinity of and overlaps the inside of the inner glass pane 9. The armoring device 19 thus has a stepped configuration 23 with one step, which corresponds to and is adapted shape-wise to the stepped configuration of the bullet-proof glass pane 22 between the protrusion 12 and the strip 13, so that a close overlap and compact structure of the security apparatus is achieved.

With its protrusion, the bullet-proof glass pane 22 is fixed to and is supported on a stepped frame 14 of the body of the vehicle by means of an adhesive bead 21. Moreover, the bullet-proof glass pane 22 is also glued to and additionally supported by the inner plate 19.2 of the armoring device 19 by means of a further adhesive bead 20.

FIG. 2 is a partial view of a further embodiment of the bullet-proof glass pane 22.1 of the present invention as a composite security glass pane in cross-section, with a stepped vehicle frame 14 or rabbet indicated with a broken line. The following is an explanation in detail of the embodiment of the present invention shown in FIG. 2 with exemplary reference to the use of the bullet-proof glass pane 22.1 according to the present invention as the windshield of a motor vehicle.

The bullet-proof glass pane 22.1 of FIG. 2 has five sandwiched or laminated glass panes 1, 3, 5, 7.1 and 9.1, wherein the innermost pane 9.1 is on the inside of the vehicle and the outermost glass pane 1 is on the outside of the vehicle, i.e. on the side of impact, and the glass panes 3, 5, 7.1 are interposed between the outermost glass pane 1 or the outer glass pane and the innermost glass pane 9.1. The outside and thus the side facing impact of the vehicle is indicated by arrow A in FIG. 2, which faces toward the outer glass pane 1. Between the outer glass pane 1 and the subsequent glass pane 3, a bonding interlayer 2 of plastic material, e.g. of polyurethane (PU) or polyvinyl butyral (PVB) extends, which forms a bond between the outer glass pane 1 and the glass pane 3. The bonding interlayer or composite foil, e.g. polyurethane foil, has the same contour and surface extension as the glass pane 3.

Between the glass pane 3 and the subsequent glass pane 5 further to the inside, a further bonding interlayer 4, e.g. a further polyurethane layer or a bonding interlayer of polyvinyl butyral (PVB) is formed, again forming a strong bond between the glass pane 3 and the subsequent glass pane 5. The bonding interlayer 4 has the same surface extension as the adjacent side surfaces of glass panes 3 and 5.

Between the glass pane 5 and the subsequent glass pane 7.1 further to the inside, is a further bonding interlayer 6, e.g. a further polyurethane layer or a bonding interlayer of polyvinyl butyral (PVB), forming a strong bond between glass panes 5 and 7.1. Again, the bonding interlayer 6 has the same surface extension as the adjacent side surfaces of glass panes 5 and 7.1.

Between the glass pane 7.1 and subsequent inner glass pane 9.1, a bonding interlayer 8.1, e.g. a further polyurethane layer or a bonding interlayer of polyvinyl butyral (PVB) is formed, which, again, forms a strong bond between glass panes 7.1 and 9.1. The bonding interlayer 8.1 also has the same surface extension as the adjacent side surfaces of glass panes 7.1 and 9.1. Glass panes 3, 5, 7.1 and 9.1 together with bonding interlayers 2, 4, 6 and 8.1 form a ballistic block 10.1, which has planar end surfaces 11.1 and 11.2 parallel and offset with respect to each other, which together form a peripheral end face of the stepped ballistic block 10.1.

The outer glass pane 1 protrudes over the other glass panes 3, 5, 7.1 and 9.1, and the ballistic block 10.1 at the edge or the circumference of the bullet-proof glass pane 22.1 of the present invention according to FIG. 2, with a protrusion 12, thus forming a stepped configuration 24.1 or step, with respect to the flush and same-size glass panes 3 and 5 of the ballistic block 10 on the end face or circumference of the bullet-proof glass pane 22.1. The glass panes 3 and 5 protrude over the glass panes 7.1 and 9.1 of the ballistic block 10.1 at the edge or circumference of the bullet-proof glass pane 22.1, thus forming a further step 24.2 from the flush glass panes 3 and 5 to the flush and same-size glass panes 7.1 and 9.1 of the ballistic block 10.1.

On the planar end face 11.1 of the ballistic block 10.1, a first bullet-resistant strip 13.1 with a rectangular cross-section is mounted on the side and flush with the glass panes 3 and 5, the bullet-resistant strip 13.1 being fixed on the end face 11.1 in a strong bond by means of a bonding interlayer 15.1, e.g. a polyurethane layer or adhesive layer. The bullet-resistant strip 13.1 is of steel, in particular of a ballistic steel, which encloses the bullet-proof glass pane in a frame-like manner. The bullet-resistant strip 13.1 can be assembled of a plurality of subsequent portions in series, which loosely engage each other at the abutment positions, to achieve a certain mutual mobility to be able to compensate dimensional variations of the strip 13.1 due to temperature variations to avoid damage to the bullet-proof glass pane 22.1. On the end face 11.2 of the ballistic block 11.1, a second bullet-resistant strip 13.2 with a rectangular cross-section is mounted on the side and flush with the glass panes 7.1 and 9.1, wherein the bullet-resistant strip 13.2 is fixed on the end face 11.2 in a strong bond by means of a further bonding interlayer 15.2, e.g. a polyurethane layer or adhesive layer. The bullet-resistant strip 13.2 is of steel, in particular ballistic steel, which encloses the bullet-proof glass pane in a frame-like manner. Again, the bullet-resistant strip 13.2 can be assembled of a series of subsequent portions preferably loosely engaging each other at the abutment positions to achieve mutual mobility and thus to compensate dimensional variations of the strip 13.2 due to temperature variations to avoid damage to the bullet-proof glass pane 22.1.

On the inside surface of the innermost glass pane 9.1, there is a sequence of layers with a polyurethane layer 16 and a polycarbonate pane 17, which are shorter than the innermost glass pane 9.1, i.e. the inner glass pane 9.1 protrudes over the layers 16 and 17. An end area of layers 16 and 17 can be covered by a protective foil of plastic material.

FIG. 2 schematically shows a partial view of a further embodiment of the bullet-resistant apparatus or security apparatus of the present invention, which comprises the bullet-proof glass pane 22.1 and an armoring device 19.1, which is mounted on the inside of a vehicle body and which securely overlaps the outer area of the bullet-proof glass pane 22.1 in order to ensure the required bullet-resistant properties.

The armoring device 19.1 here is of three bonded plates 19.11, 19.12 and 19.13 or reinforcements, in particular of ballistic steel, wherein the flush plates 19.11 and 19.12 extend into the close vicinity of the strip 13.1 of the bullet-proof glass pane 22.1 and overlap the protrusion 12, and the plate 19.13, arranged on the inside, extends into the close vicinity of and overlaps the inside of the innermost glass pane 9.1. The armoring device 19.1 thus has a stepped configuration 23.1 having two steps 24.1 and 24.2 corresponding to a stepped configuration of the bullet-proof glass pane 22.1 between the protrusion 12 and the strip 13.1 and between the strip 13.1 and the strip 13.2 and is adapted with respect to its shape in such a manner that a close overlap and a compact structure of the security apparatus is achieved.

With its protrusion 12, the bullet-proof glass pane 22.1 is fixed to and supported on a stepped frame 14 of the body of the vehicle by means of the adhesive bead 21. Moreover, the bullet-proof glass pane 22.1 is also glued to and additionally supported by the inner plate 19.13 of the armoring device 19.1 by means of a further adhesive bead 20. In addition, a third adhesive bead 25 is provided, by means of which the strip 13.1 is glued to the outer plate 19.11.

The invention claimed is:

1. A bullet-proof glass pane for a motor vehicle, said bullet-proof glass pane comprising;
   a ballistic block including
      a plurality of panes of glass, ceramic or plastic material, and
      interlayers of plastic material interposed between the plurality of panes, wherein said plurality of panes are bonded to each other, by the interlayers, over corresponding surfaces of the panes in a layered composite; and
   wherein
   the ballistic block has an end face having a stepped configuration on an outer periphery of the bullet-proof glass pane, the stepped configuration is stepped down from an outer side to an inner side of the bullet-proof glass pane, and includes at least two planar end surfaces extending in parallel and offset with respect to each other, and
the at least two bullet-resistant strips correspond to the at least two planar end surfaces of the ballistic block and cover the at least two planar end surfaces of the ballistic block in a flush manner.

2. The bullet-proof glass pane according to claim 1, wherein each of the strips is of metal including ballistic steel.

3. The bullet-proof glass pane according to claim 1, further comprising at least one outer pane of glass, ceramic or plastic bonded to the ballistic block on a side on which the ballistic block is configured to receive impact,
   wherein the at least one outer pane protrudes from the ballistic block at the outer periphery of the bullet-proof glass pane.

4. The bullet-proof glass pane according to claim 1, further comprising an outer pane of glass, ceramic or plastic bonded to the ballistic block on a side on which the ballistic block is configured to receive impact,
   wherein the outer pane protrudes from the ballistic block and the at least two strips at the outer periphery of the bullet-proof glass pane to form a protrusion of the bullet-proof glass pane for mounting the bullet-proof glass pane on or in a frame or rabbet of a body of the motor vehicle.

5. The bullet-proof glass pane according to claim 4, wherein the protrusion of the bullet-proof glass pane has a stepped configuration.

6. The bullet-proof glass pane according to claim 1, wherein the strips have same thicknesses
   in a first direction normal to the bullet-proof glass pane or
   in a second direction parallel to a plane of the bullet-proof glass pane.

7. The bullet-proof glass pane according to claim 1, wherein the strips are bonded to the ballistic block as edge reinforcement.

8. The bullet-proof glass pane according to claim 1, further comprising an edge-side protrusion that is flush with one of the strips.

9. A bullet-resistant apparatus for a motor vehicle, the apparatus comprising:
   a bullet-proof glass pane including
      a ballistic block having
         a plurality of panes of glass, ceramic or plastic material, and
         interlayers of plastic material interposed between the plurality of panes, wherein said plurality of panes are bonded to each other, by the interlayers, over corresponding surfaces of the panes in a layered composite; and
      at least one bullet-resistant strip having a substantially rectangular cross-section and covering a peripheral edge of the ballistic block; and
   a bullet-resistant armoring device configured to be arranged inside the motor vehicle adjacent to the bullet-proof glass pane and overlapping an area of an outer periphery of the bullet-proof glass pan;
   wherein the armoring device has a stepped configuration engaging and overlapping a part of the ballistic block.

10. The apparatus according to claim 9, wherein the armoring device supports the bullet-proof glass pane.

11. The apparatus according to claim 9, wherein
   the ballistic block of the bullet-proof glass pane has an end face having a stepped configuration, the stepped configuration of the armoring device corresponds to the stepped configuration of the ballistic block in such a manner that the stepped configuration of the armoring device engages and overlaps the stepped configuration of the ballistic block.

12. The apparatus according claim 9, wherein the bullet-proof glass pane is mounted in or on a frame or rabbet of a body of the motor vehicle and the frame or rabbet supports the bullet-proof glass pane.

13. The apparatus according to claim 12, wherein the bullet-proof glass pane at the outer periphery thereof has a protrusion configured to be attached or bonded to a stepped profile of the body of the motor vehicle.

14. The apparatus according to claim 13, wherein
the protrusion of the bullet-proof glass pane has a stepped configuration at an end face of the bullet-proof glass pane, and
the stepped configuration of the protrusion of the bullet-proof glass pane is configured to correspond to the stepped profile of the body of the motor vehicle and engage the stepped profile of the body of the motor vehicle.

15. A bullet-resistant apparatus for a motor vehicle, said apparatus comprising:
a bullet-proof glass pane having a ballistic block including
a plurality of panes of glass, ceramic or plastic material, and
interlayers of plastic material interposed between the plurality of panes, wherein said plurality of panes are bonded to each other, by the interlayers, over corresponding surfaces of the panes in a layered composite; and
wherein
the ballistic block has an end face having a stepped configuration on an outer periphery of the bullet-proof glass pane,
the stepped configuration is stepped down from an outer side to an inner side of the bullet-proof glass pane, and includes at least two planar end surfaces extending in parallel and offset with respect to each other, and
the at least two bullet-resistant strips correspond to the at least two planar end surfaces of the ballistic block and cover the at least two planar end surfaces of the ballistic block in a flush manner,
a bullet-resistant armoring device configured to be arranged inside the motor vehicle, adjacent to the bullet-proof glass pane, and overlapping an area of the outer periphery of the bullet-proof glass pane,
wherein the armoring device has a stepped configuration engaging and overlapping the stepped configuration of the ballistic block.

16. The bullet-proof glass pane according to claim 1, wherein the strips have different thicknesses
in a first direction normal to the bullet-proof glass pane or
in a second direction parallel to a plane of the bullet-proof glass pane.

* * * * *